United States Patent
Kang et al.

(10) Patent No.: US 10,661,790 B2
(45) Date of Patent: May 26, 2020

(54) APPARATUS AND METHOD FOR CONTROLLING DRIVING OF VEHICLE

(71) Applicants: HYUNDAI MOTOR COMPANY, Seoul (KR); KIA MOTORS CORPORATION, Seoul (KR)

(72) Inventors: Min Chul Kang, Uiwang-si (KR); Beom Jun Kim, Seoul (KR); Kyoung Jun Lee, Seoul (KR); Doo Jin Um, Seoul (KR); Dong Gu Lee, Seoul (KR); Dong Eon Oh, Seoul (KR); Hyun-Jae Yoo, Seoul (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Chan-Il Park, Chungcheongbuk-do (KR); Sung Yoon Yeo, Seoul (KR); Jee Young Kim, Yongin-si (KR); Hoi Won Kim, Gwacheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 32 days.

(21) Appl. No.: 16/010,803

(22) Filed: Jun. 18, 2018

(65) Prior Publication Data

US 2019/0256083 A1 Aug. 22, 2019

(30) Foreign Application Priority Data

Feb. 20, 2018 (KR) ........................ 10-2018-0019646

(51) Int. Cl.
*B60W 30/09* (2012.01)
*B60W 10/04* (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 30/09; B60W 10/04; B60W 10/20; B60W 2420/42; B60W 2420/52; B60W 2550/302
See application file for complete search history.

(56) References Cited

U.S. PATENT DOCUMENTS 5,463,384 A * 10/1995 Juds ........................ G01S 17/04
  340/903
6,370,475 B1 * 4/2002 Breed .................. B60N 2/2863
  340/436

(Continued)

FOREIGN PATENT DOCUMENTS

JP 2013-252796 A 12/2013
JP 2015-207164 A 11/2015
(Continued)

*Primary Examiner* — Behrang Badii
*Assistant Examiner* — Daniel L Greene
(74) *Attorney, Agent, or Firm* — Morgan, Lewis & Bockius LLP

(57) ABSTRACT

An apparatus for controlling driving of a vehicle includes a display located in the vehicle, a sensor configured to collect information about a surrounding vehicle, and a processor electrically connected with the display and the sensor, and configured to obtain location information and speed information of at least one surrounding vehicle located on
(Continued)

neighboring lanes beside a driving lane where the vehicle is traveling, using the sensor, when the at least one surrounding vehicle is located within a danger distance in a lateral direction of the vehicle, perform avoidance driving for avoiding the at least one surrounding vehicle in the driving lane, and display an indicator corresponding to the avoidance driving on the display.

20 Claims, 8 Drawing Sheets

(51) Int. Cl.
*B60W 10/20* (2006.01)
*G05D 1/02* (2020.01)

(52) U.S. Cl.
CPC ..... *B60W 2420/42* (2013.01); *B60W 2420/52* (2013.01); *B60W 2554/4041* (2020.02); *B60W 2554/801* (2020.02); *B60W 2554/804* (2020.02); *B60W 2710/20* (2013.01); *B60W 2720/10* (2013.01); *B60W 2754/10* (2020.02); *B60W 2754/30* (2020.02); *B60W 2754/50* (2020.02); *G05D 1/0214* (2013.01); *G05D 1/0223* (2013.01); *G05D 1/0246* (2013.01); *G05D 1/0257* (2013.01); *G05D 2201/0213* (2013.01)

(56) References Cited

U.S. PATENT DOCUMENTS

| | | | |
|---|---|---|---|
| 9,789,817 B2* | 10/2017 | Yamada | B60Q 9/008 |
| 2004/0193347 A1* | 9/2004 | Harumoto | B60T 8/1755 |
| | | | 701/45 |
| 2005/0154505 A1* | 7/2005 | Nakamura | G01C 21/365 |
| | | | 701/1 |
| 2006/0164230 A1* | 7/2006 | DeWind | B60K 35/00 |
| | | | 340/461 |
| 2010/0023232 A1* | 1/2010 | Isaji | B60W 30/146 |
| | | | 701/70 |
| 2014/0240115 A1* | 8/2014 | Igarashi | B60W 30/08 |
| | | | 340/435 |
| 2014/0278059 A1* | 9/2014 | Gunther | B60W 30/09 |
| | | | 701/414 |
| 2015/0120137 A1 | 4/2015 | Zeng et al. | |
| 2015/0151725 A1* | 6/2015 | Clarke | B60W 30/00 |
| | | | 701/28 |
| 2015/0298692 A1 | 10/2015 | Minemura et al. | |
| 2016/0375903 A1 | 12/2016 | Minemura et al. | |
| 2018/0001894 A1 | 1/2018 | Masui et al. | |

FOREIGN PATENT DOCUMENTS

| | | |
|---|---|---|
| JP | 2016-037267 A | 3/2016 |
| JP | 2016-134093 A | 7/2016 |
| JP | 2017-117345 A | 6/2017 |
| WO | 2017-110703 A1 | 6/2017 |

* cited by examiner

APPARATUS AND METHOD FOR CONTROLLING DRIVING OF VEHICLE

CROSS-REFERENCE TO RELATED APPLICATION

This application is based on and claims the benefit of priority to Korean Patent Application No. 10-2018-0019646, filed on Feb. 20, 2018, in the Korean Intellectual Property Office, the disclosure of which is incorporated herein in its entirety by reference.

TECHNICAL FIELD

The present disclosure relates to an apparatus and method for controlling avoidance driving of a vehicle.

BACKGROUND

With the development of the auto industry, a highway driving assist system for allowing a vehicle to partially perform autonomous driving on a highway has been developed. The highway driving assist system may provide various functions such as setting speed keeping, vehicle-to-vehicle distance keeping, and lane keeping. The vehicle may collect information about a surrounding vehicle located in another lane adjacent to its driving lane as well as a surrounding vehicle located in the driving lane. Depending on a driving situation, the highway driving assist system may be required to perform driving in consideration of a location, a speed, and the like of a surrounding vehicle located in a neighboring lane.

When the surrounding vehicle located in the neighboring lane beside the driving lane of the vehicle is traveling in a state where it is slanted close to the driving lane, particularly when the vehicle overtakes the surrounding vehicle, a driver of the vehicle may feel anxious due to the closeness of the surrounding vehicle to the vehicle. Thus, there is a need for developing an avoidance strategy capable of reducing anxiety of the driver when the vehicle overtakes a surrounding vehicle which is traveling in a state where it is slanted in the direction of the driving lane from the neighboring lane.

SUMMARY

The present disclosure has been made to solve the above-mentioned problems occurring in the prior art while advantages achieved by the prior art are maintained intact.

An aspect of the present disclosure provides an apparatus including a user interface (UI) for displaying a strategy and avoidance driving for avoiding a surrounding vehicle which is traveling in a state where it is slanted in the direction of a driving lane from a neighboring lane in a highway driving assist system and a method thereof.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling driving of a vehicle may include: a display located in the vehicle, a sensor configured to collect information about a surrounding vehicle, and a processor configured to be electrically connected with the display and the sensor. The processor may be configured to obtain location information and speed information of at least one surrounding vehicle located on neighboring lanes beside a driving lane where the vehicle is traveling, using the sensor, when the at least one surrounding vehicle is located within a danger distance in a lateral direction of the vehicle, perform avoidance driving for avoiding the at least one surrounding vehicle in the driving lane, and display an indicator corresponding to the avoidance driving on the display.

According to an embodiment, the processor may be configured to, when a relative speed between at least one surrounding vehicle and the vehicle is less than a specified value, perform the avoidance driving.

According to an embodiment, the processor may be configured to, when the at least one surrounding vehicle is located within a specified distance in a longitudinal direction of the vehicle, perform the avoidance driving.

According to an embodiment, the processor may be configured to set the danger distance based on at least a portion of a size of the vehicle, a type of the vehicle, a speed of the vehicle, a size of the at least one surrounding vehicle, a type of the at least one surrounding vehicle, a speed of the at least one surrounding vehicle, or a width of the driving lane.

According to an embodiment, the processor may be configured to, when one surrounding vehicle is located within the danger distance in a lateral direction of the vehicle, perform the avoidance driving along a route away from the one surrounding vehicle in the driving lane.

According to an embodiment, the processor may be configured to display the indicator indicating a direction of the avoidance driving on the display.

According to an embodiment, the processor may be configured to display an indicator indicating a direction of the avoidance driving within a zone indicating the driving lane on the display.

According to an embodiment, the processor may be configured to, when the one surrounding vehicle is located within a specified distance in front of the vehicle, calculate the route.

According to an embodiment, the processor may be configured to, when the one surrounding vehicle is located within a specified distance from the vehicle in a rear direction, maintain the avoidance driving.

According to an embodiment, the processor may be configured to, when the one surrounding vehicle is located further than a specified distance from the vehicle in a rear direction, release the avoidance driving.

According to an embodiment, the neighboring lanes may include a first neighboring lane located at a left-hand side of the driving lane and a second neighboring lane located at a right-hand side of the driving lane. The at least one surrounding vehicle may include a first surrounding vehicle located on the first neighboring lane and a second surrounding vehicle located on the second neighboring lane. The processor may be configured to, when the first surrounding vehicle and the second surrounding vehicle are located in the danger distance in the lateral direction of the vehicle, perform the avoidance driving by reducing a speed of the vehicle.

According to an embodiment, the processor may be configured to display indicators respectively corresponding to an object indicating the first surrounding vehicle and an object indicating the second surrounding vehicle on the display.

According to an embodiment, the processor may be configured to display an indicator indicating the reduction of the speed of the vehicle on the display.

According to an embodiment, the processor may be configured to, when the first surrounding vehicle and the second surrounding vehicle are located within the danger distance in the lateral direction of the vehicle and within a specified distance from the vehicle in a forward direction, calculate a target speed of the vehicle and control the vehicle to perform deceleration driving depending on the target speed.

According to another aspect of the present disclosure, a method for controlling driving of a vehicle may include: obtaining location information and speed information of at least one surrounding vehicle located on neighboring lanes beside a driving lane where the vehicle is traveling, when the at least one surrounding vehicle is located within a danger distance in a lateral direction of the vehicle, performing avoidance driving for avoiding the at least one surrounding vehicle in the driving lane, and displaying an indicator corresponding to the avoidance driving.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
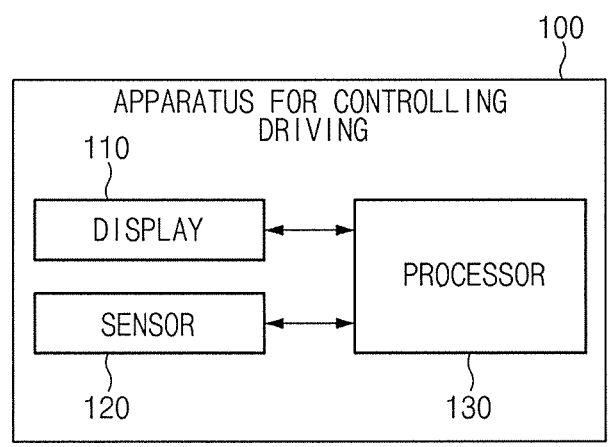
FIG. 1 is a block diagram illustrating a configuration of an apparatus for controlling driving of a vehicle according to an embodiment of the present disclosure.

FIG. 1 is a block diagram illustrating a configuration of an apparatus for controlling driving of a vehicle according to an embodiment of the present disclosure.

Referring to FIG. 1, an apparatus 100 for controlling driving of a vehicle (hereinafter referred to as "apparatus 100" for convenience of description) according to an embodiment of the present disclosure may include a display 110, a sensor 120, and a processor 130. The apparatus 100 may be loaded into the vehicle.

The display 110 may be located in the vehicle. The display 110 may provide a variety of visual information. For example, the display 110 may display a user interface (UI) indicating the vehicle, a surrounding vehicle, a lane, a driving speed, a type of a road, a speed limit, and the like.

The sensor 120 may be configured to collect information about a surrounding vehicle. The sensor 120 may obtain information about a location and speed of the surrounding vehicle. The sensor 120 may include, for example, a camera, a radar, a light detection and ranging (LiDAR), and/or the like.

The processor 130 may be electrically connected with the display 110 and the sensor 120. The processor 130 may control the display 110 and the sensor 120, and may be an electric circuitry that executes instructions of software which thereby performs a variety of data processing and various arithmetic operations described hereinafter.

According to an embodiment, the processor 130 may obtain location information and speed information of at least one surrounding vehicle located on a neighboring lane beside a driving lane where the vehicle is traveling, using the sensor 120. The processor 130 may obtain location information and speed information of a surrounding vehicle using an image obtained by the camera or information collected by the radar or the LiDAR. The neighboring lanes may include a lane adjacent to the left-hand side of the driving lane and a lane adjacent to the right-hand side of the driving lane.

According to an embodiment, when at least one surrounding vehicle is located within a danger distance in a lateral direction of the vehicle, the processor 130 may control the vehicle to perform avoidance driving for avoiding the at least one surrounding vehicle in a driving lane.

The processor 130 may determine whether a surrounding vehicle is located within a danger distance (e.g., 0.3 m from a line of a driving lane) in a lateral direction of the vehicle. For example, when at least one surrounding vehicle is located within a danger distance in a lateral direction of the vehicle, when a relative speed between the at least one surrounding vehicle and the vehicle is less than a specified value (i.e., when it is determined that the vehicle will overtake the surrounding vehicle), or when the at least one surrounding vehicle is located within a specified distance in a longitudinal direction of the vehicle, the processor 130 may control the vehicle to perform avoidance driving.

According to an embodiment, the processor 130 may set a danger distance based on at least a portion of a size of the vehicle, a type of the vehicle, a speed of the vehicle, a size of at least one surrounding vehicle, a type of the at least one surrounding vehicle, a speed of the at least one surrounding vehicle, or a width of a driving lane. The processor 130 may adjust the danger distance using information associated with the vehicle, the surrounding vehicle, and the driving lane to be suitable for a situation.

According to an embodiment, when one surrounding vehicle is located within a danger distance in a lateral direction of the vehicle, the processor 130 may control the vehicle to perform avoidance driving along a route away from the one surrounding vehicle in a driving lane. According to an embodiment, when the one surrounding vehicle is located within the danger distance in the lateral direction of the vehicle and is located within a specified distance from the vehicle in a forward direction, the processor 130 may calculate a route for avoidance driving. For example, the processor 130 may generate an avoidance route which faces a point away from the center of a driving lane by a specified distance in a direction opposite to a surrounding vehicle located in a danger distance. The processor 130 may generate a return route from the point to the center of the driving lane. The processor 130 may generate an avoidance route and a return route using an equation of the fifth degree. The processor 130 may control the vehicle to travel along the avoidance route.

According to an embodiment, when one surrounding vehicle is located within a specified distance from the vehicle in a rear direction, the processor 130 may control the vehicle to maintain avoidance driving. After the vehicle overtakes a surrounding vehicle, when the surrounding vehicle is located within a specified distance, the processor 130 may control the vehicle to maintain an avoidance location.

According to an embodiment, when one surrounding vehicle is located further than a specified distance from the vehicle in a rear direction, the processor 130 may control the vehicle to release the avoidance driving. When a surrounding vehicle is away from the vehicle, the processor 130 may control the vehicle to travel along a return route and may control the vehicle to return to the center of a driving lane.

According to an embodiment, when a first surrounding vehicle and a second surrounding vehicle are located within a danger distance in a lateral direction of the vehicle, the processor 130 may control the vehicle to perform avoidance driving by reducing a speed of the vehicle. The first surrounding vehicle may be a vehicle located on a first neighboring lane located at the left-hand side of a driving lane. The second surrounding vehicle may be a vehicle located on a second neighboring lane located at the right-hand side of the driving lane. According to an embodiment, when the first surrounding vehicle and the second surrounding vehicle are located within a danger distance in a lateral direction of the vehicle and are located within a specified distance from the vehicle in a forward direction, the processor 130 may calculate a target speed of the vehicle for deceleration driving. The processor 130 may control the vehicle to perform the deceleration driving depending on the target speed.

According to an embodiment, the processor 130 may display an indicator corresponding to avoidance driving on the display 110. The processor 130 may display an indicator for notifying a driver of avoidance driving on the display 110.

For example, when the vehicle performs avoidance driving in a direction opposite to a surrounding vehicle in its driving lane, the processor 130 may display an indicator indicating a direction of the avoidance driving on the display 110. The processor 130 may display the indicator indicating the direction of the avoidance driving within a zone indicating the driving lane on the display 110.

For another example, when the vehicle performs avoidance driving of reducing its speed in its driving lane, the processor 130 may display indicators respectively corresponding to objects indicating the first surrounding vehicle and the second surrounding vehicle which cause avoidance driving on the display 110. The processor 130 may display an indicator indicating that a speed of the vehicle is reduced, on the display 110.

Figure 2:
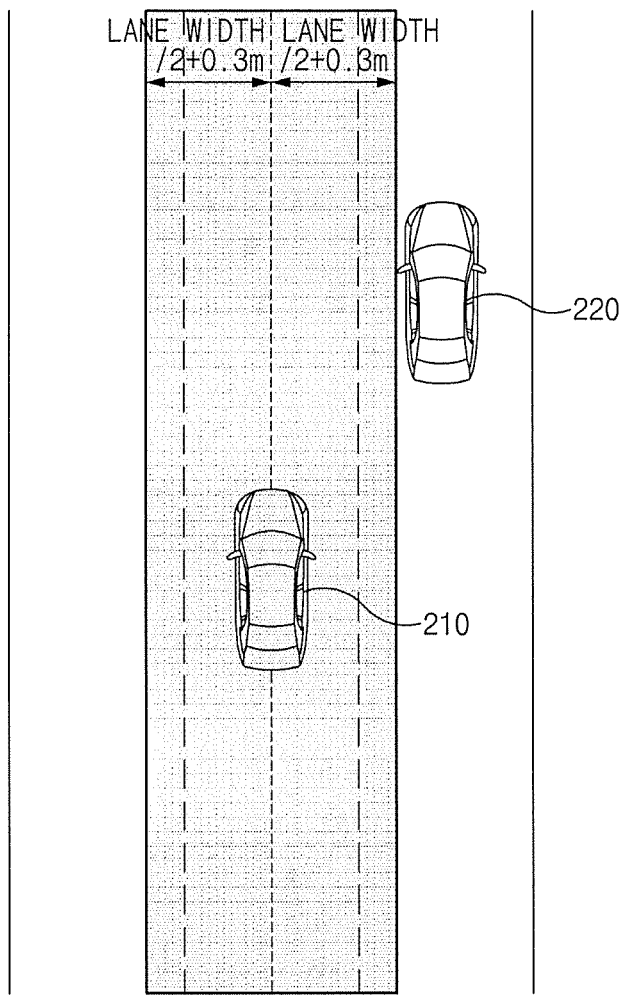
FIG. 2 is a drawing illustrating an exemplary operation of an apparatus for controlling driving of a vehicle according to an embodiment of the present disclosure.

FIG. 2 is a drawing illustrating an exemplary operation of an apparatus for controlling driving of a vehicle according to an embodiment of the present disclosure.

Referring to FIG. 2, a vehicle 210 according to an embodiment may travel along the center of its driving lane. The vehicle 210 may obtain information, for example, speed information and location information, about a surrounding vehicle 220 on a right neighboring lane of the driving lane. The vehicle 210 may determine whether the surrounding vehicle 220 is located within a lateral avoidance zone. According to an embodiment, the vehicle 210 may determine whether the surrounding vehicle 220 is located within a danger distance from the center of the driving lane in a lateral direction of the vehicle. For example, the vehicle 210 may recognize the surrounding vehicle 220 located within a constant range (e.g., a lane width/2+0.3 m) in a lateral direction of the vehicle 210. Herein, 0.3 m may be adjusted based on at least a portion of a size of the vehicle 210, a type of the vehicle 210, a speed of the vehicle 210, a size of the at least one surrounding vehicle 220, a type of the at least one surrounding vehicle 220, a speed of the at least one surrounding vehicle 220, or a width of the driving lane. When the surrounding vehicle 220 in the lateral avoidance zone is located in a longitudinal avoidance zone, the vehicle 210 may determine the surrounding vehicle 220 as a vehicle to be avoided. A description will be given of the longitudinal avoidance zone with reference to FIG. 3.

Figure 3:
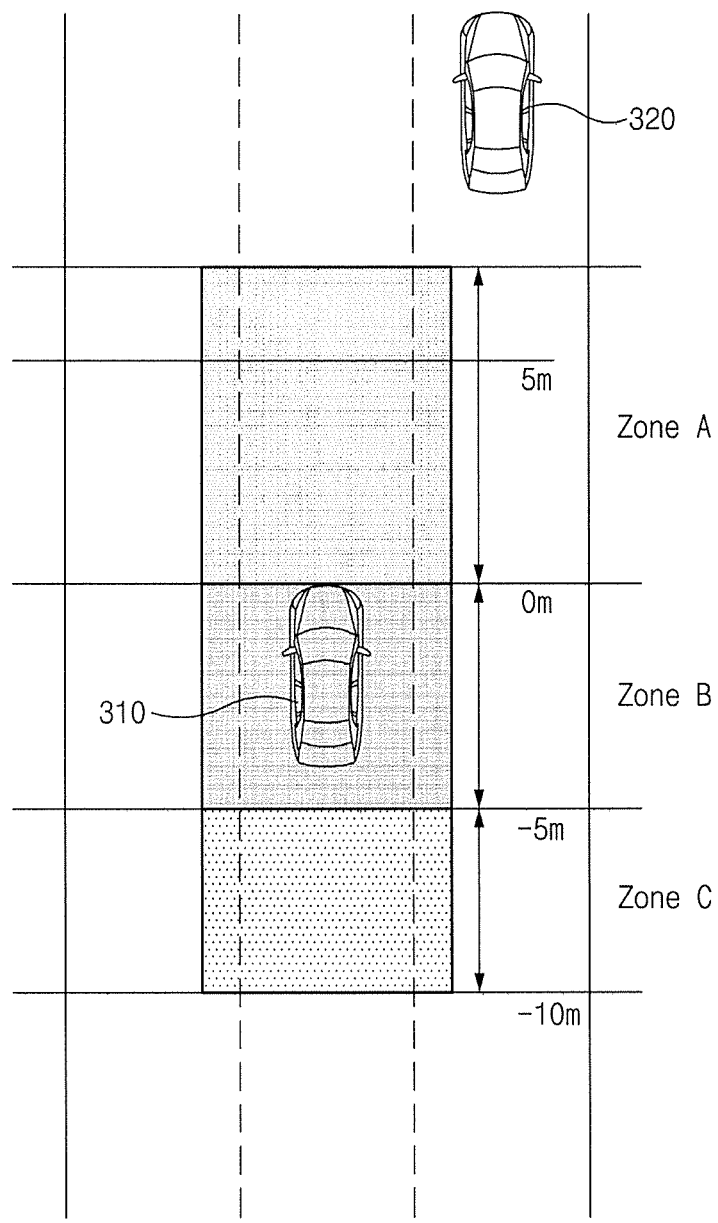
FIG. 3 is a drawing illustrating an exemplary operation of an apparatus for controlling driving of a vehicle according to an embodiment of the present disclosure.

FIG. 3 is a drawing illustrating an exemplary operation of an apparatus for controlling driving of a vehicle according to an embodiment of the present disclosure.

Referring to FIG. 3, a vehicle 310 according to an embodiment may travel along the center of its driving lane. The vehicle 310 may obtain information, for example, speed information and location information, about a surrounding vehicle 320 on a right neighboring lane of the driving lane. The vehicle 310 may determine whether the surrounding vehicle 320 is located within a longitudinal avoidance zone. According to an embodiment, the vehicle 310 may determine whether the surrounding vehicle 320 is located within a specified distance in a longitudinal direction of the vehicle 310.

When the surrounding vehicle 320 in the lateral avoidance zone is located within a specified distance from a front bumper of the vehicle 310 in a forward direction and when a relative speed of the surrounding vehicle 320 to the vehicle 310 is within a range of, for example, −40 kph (kilometers per hour) to 0 kph, the vehicle 310 may determine the surrounding vehicle 320 as a vehicle to be avoided. For example, when the surrounding vehicle 320 is located in zone A (e.g., a zone within 5 m from the front bumper of the vehicle 310 in a forward direction), the vehicle 310 may determine the surrounding vehicle 320 as a vehicle to be avoided. In this case, the vehicle 310 may generate an avoidance route to start avoidance driving. A length of zone A may be determined as a value which is larger between a distance corresponding to a time when the vehicle 310 is able to move in a lateral direction along the avoidance route and a minimum distance (e.g., 5 m) for avoiding a forward vehicle.

When the surrounding vehicle 320 in a lateral avoidance zone is located within a specified distance from the front bumper of the vehicle 310 in a rear direction and when a relative speed of the surrounding vehicle 320 to the vehicle 310 is within a range of, for example, −10 kph to 10 kph, the vehicle 310 may determine the surrounding vehicle 320 as a vehicle to be avoided and may start avoidance driving. For example, when the surrounding vehicle 320 is located in zone B (e.g., a zone within 5 m from the front bumper of the vehicle 310 in a rear direction), the vehicle 310 may determine the surrounding vehicle 320 as a vehicle to be avoided. After starting the avoidance driving, when the surrounding vehicle 320 is located in zone B, the vehicle 310 may maintain the avoidance driving.

When the surrounding vehicle 320 in the lateral avoidance zone is located outside a specified distance from the front bumper of the vehicle 310 in a rear direction, the vehicle 310 may release the avoidance driving. For example, when the surrounding vehicle 320 is located in zone C (e.g., a zone outside 5 m from the front bumper of the vehicle 310 in a rear direction), the vehicle 310 may return to the center of the driving lane. When the surrounding vehicle 320 departs from the lateral avoidance zone although it is located in zone A or B, the vehicle 310 may return to the center of the driving lane.

A length of each of zones A, B, and C may be changed according to information associated with the vehicle 310, the surrounding vehicle 320, and the driving lane.

Figure 4:
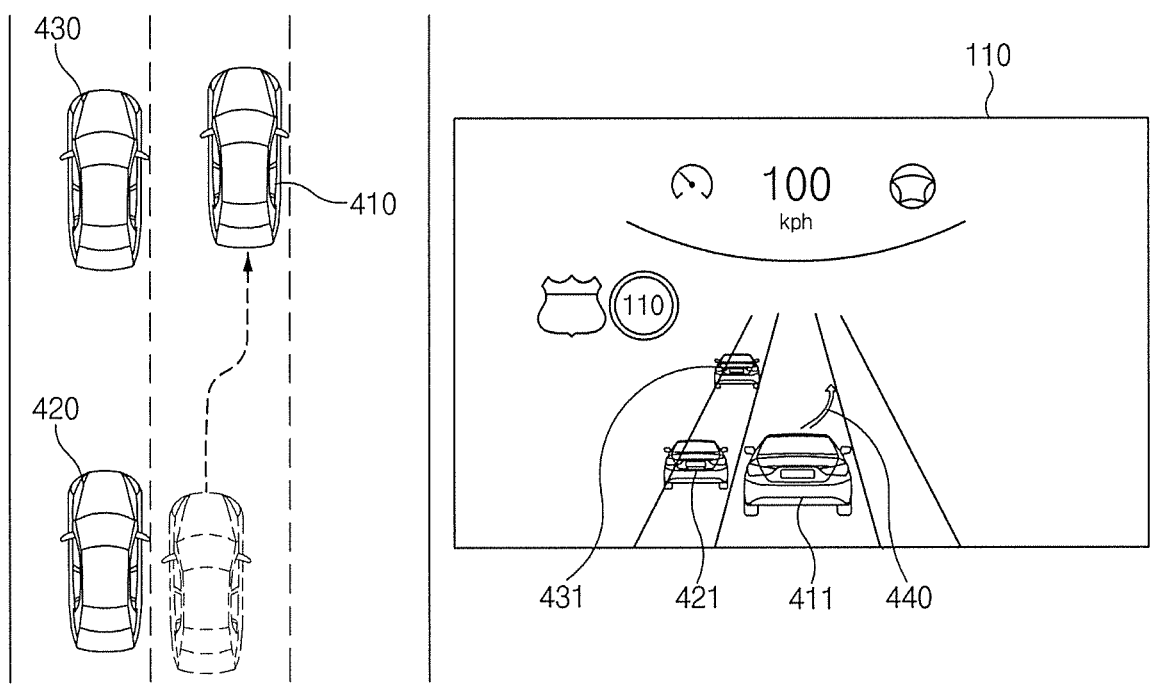
FIG. 4 is a drawing illustrating an exemplary operation of an apparatus for controlling driving of a vehicle according to an embodiment of the present disclosure.

FIG. 4 is a drawing illustrating an exemplary operation of an apparatus for controlling driving of a vehicle according to an embodiment of the present disclosure.

Referring to FIG. 4, a vehicle 410 according to an embodiment may travel along its driving lane. When a first surrounding vehicle 420 and a second surrounding vehicle 430 of its left lane travel in a state where they are adjacent to a right end of the left lane, the vehicle 410 may perform avoidance driving in the driving lane to reduce the risk of a collision and anxiety of its driver. For example, the vehicle 410 may perform avoidance driving along a route of moving to a right end of the driving lane.

The vehicle 410 may output a screen including a first object 411 indicating the vehicle 410, a second object 421 indicating the first surrounding vehicle 420, a third object 431 indicating the second surrounding vehicle 430 on its display 110. While the avoidance driving is performed, the vehicle 410 may output an arrow-shaped indicator 440 indicating a direction of the avoidance driving on a zone where the driving lane of the vehicle 410 is displayed. The driver of the vehicle 430 may recognize the performance of the avoidance driving through the indicator 440.

Figure 5:
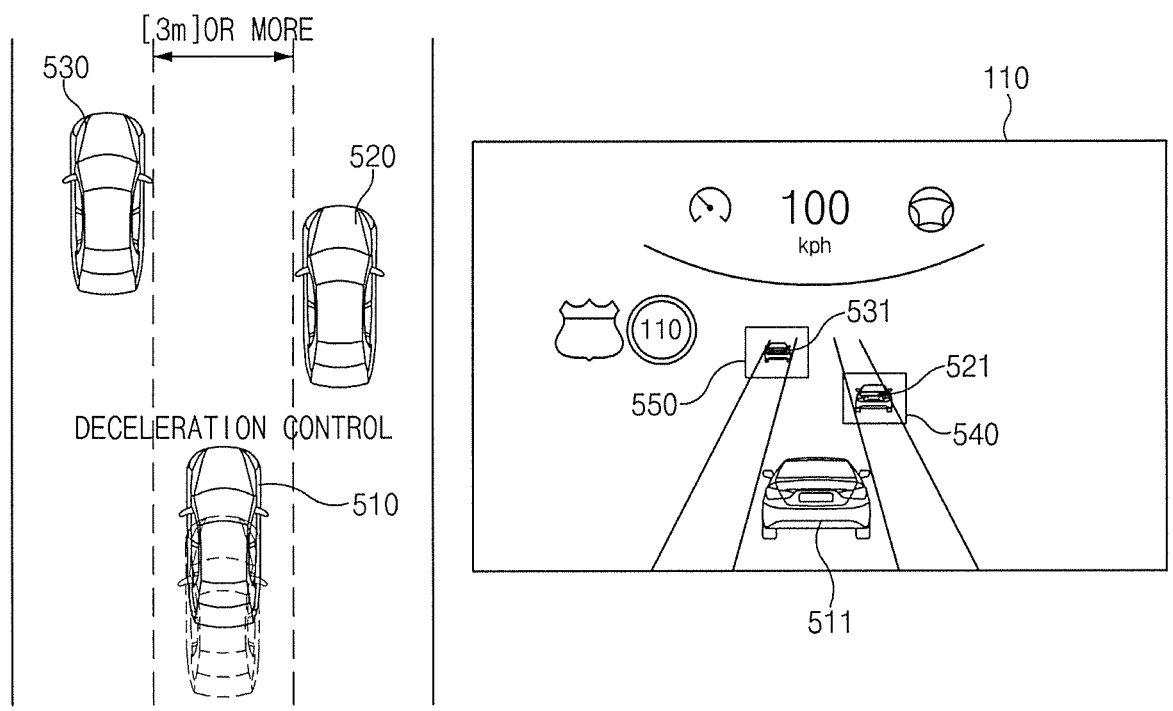
FIG. 5 is a drawing illustrating an exemplary operation of an apparatus for controlling driving of a vehicle according to an embodiment of the present disclosure.

FIG. 5 is a drawing illustrating an exemplary operation of an apparatus for controlling driving of a vehicle according to an embodiment of the present disclosure.

Referring to FIG. 5, a vehicle 510 according to an embodiment may travel along its driving lane. When a first surrounding vehicle 520 travels in a state where it is adjacent to a left end of a right lane of the vehicle 510 and when a second surrounding vehicle 530 travels in a state where it is adjacent to a right end of the left lane of the vehicle 510, the vehicle 510 may perform avoidance driving in the driving lane to reduce the risk of a collision and anxiety of its driver. For example, the vehicle 510 may perform deceleration driving.

The vehicle 510 may output a screen including a first object 511 indicating the vehicle 510, a second object 521 indicating the first surrounding vehicle 520, a third object 531 indicating the second surrounding vehicle 530 on its display 110. While the avoidance driving is performed, the vehicle 510 may output a first indicator 540 and a second indicator 550, each of which has a box shape which surrounds each of the first surrounding vehicle 520 and the second surrounding vehicle 530. Although not illustrated in FIG. 5, the vehicle 510 may output an indicator indicating deceleration driving. The driver of the vehicle 510 may recognize the performance of the avoidance driving and the vehicles 520 and 530 to be avoided, through the first indicator 540 and the second indicator 550.

Figure 6:
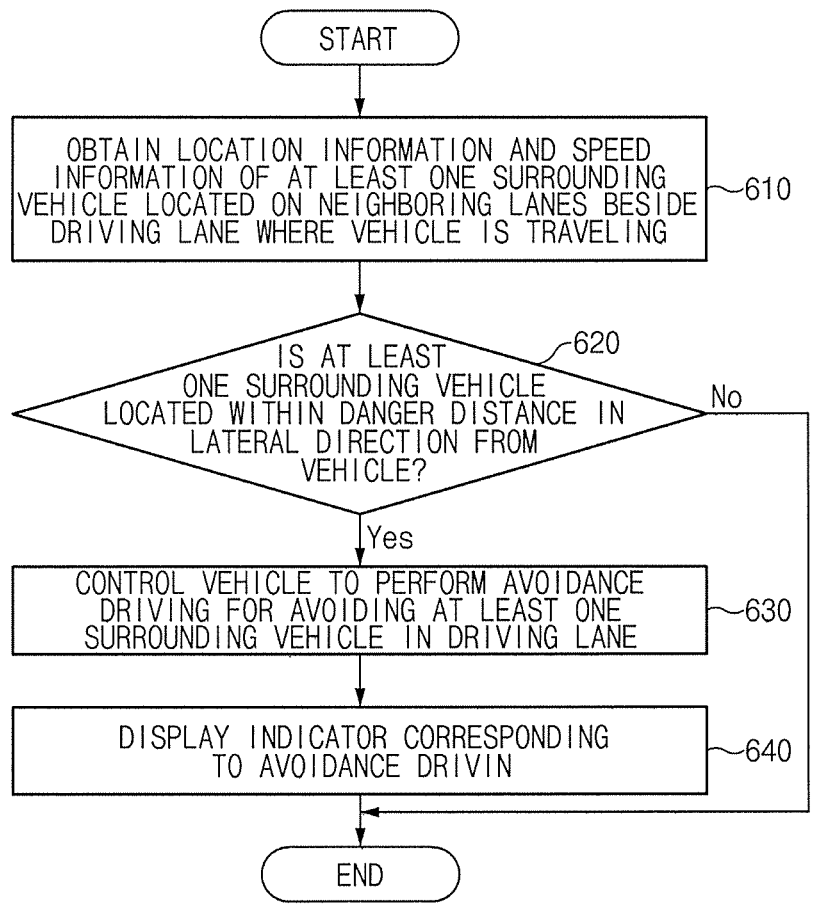
FIG. 6 is a flowchart illustrating a method for controlling driving of a vehicle according to an embodiment of the present disclosure.

FIG. 6 is a flowchart illustrating a method for controlling driving of a vehicle according to an embodiment of the present disclosure.

Hereinafter, it may be assumed that an apparatus 100 of FIG. 1 performs a process of FIG. 6. Further, in a description of FIG. 6, an operation described as being performed by an apparatus may be understood as being controlled by a processor 130 of the apparatus 100.

Referring to FIG. 6, in operation 610, the apparatus may obtain location information and speed information of at least one surrounding vehicle located on neighboring lanes beside a driving lane where a vehicle is traveling.

In operation 620, the apparatus may determine whether the at least one surrounding vehicle is located within a danger distance in a lateral direction of the vehicle. For example, the apparatus may determine whether the surrounding vehicle is located within a lateral avoidance zone and a longitudinal avoidance zone based on the location information of the surrounding vehicle. Further, the apparatus may determine whether a relative speed of the surrounding vehicle to the vehicle is within a specified range based on the speed information of the surrounding vehicle.

In operation 630, the apparatus may control the vehicle to perform avoidance driving for avoiding the at least one surrounding vehicle in the driving lane. For example, the apparatus may control the vehicle to perform avoidance driving along a route away from the surrounding vehicle and may control the vehicle to perform deceleration driving.

In operation 640, the apparatus may display an indicator corresponding to the avoidance driving. For example, the apparatus may output an indicator indicating a vehicle to be avoided and/or an avoidance direction to provide information associated with the avoidance driving to a user of the vehicle.

Figure 7:
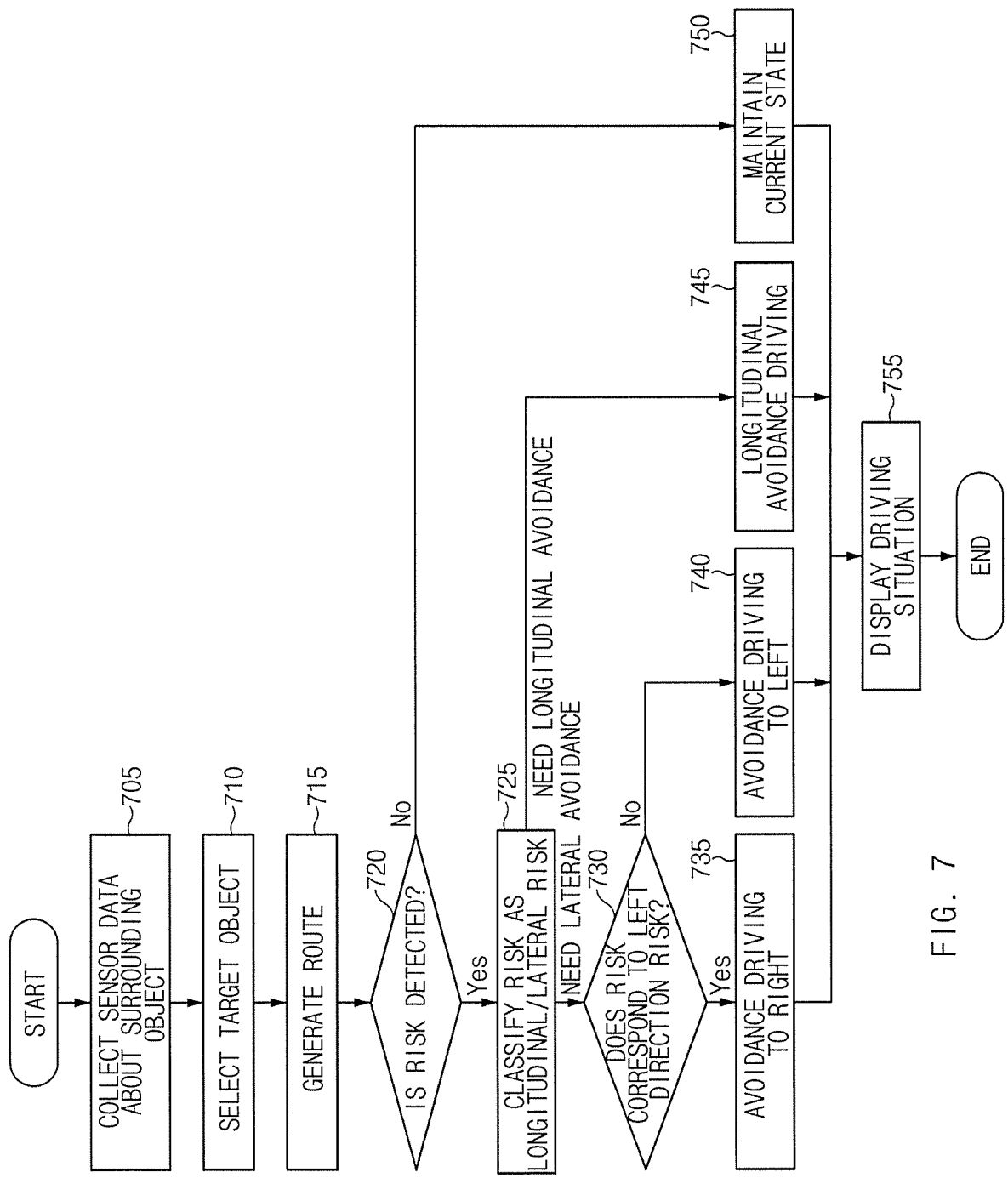
FIG. 7 is a flowchart illustrating a method for controlling driving of a vehicle according to an embodiment of the present disclosure.

FIG. 7 is a flowchart illustrating a method for controlling driving of a vehicle according to an embodiment of the present disclosure.

Hereinafter, it may be assumed that an apparatus 100 of FIG. 1 performs a process of FIG. 7. Further, in a description of FIG. 7, an operation described as being performed by an apparatus may be understood as being controlled by a processor 130 of the apparatus 100.

Referring to FIG. 7, in operation 705, the apparatus may collect sensor data about a surrounding object. For example, the apparatus may obtain the sensor data and may output information about a movement object and information about a stop object.

In operation 710, the apparatus may select a target object. For example, the apparatus may select a vehicle located within a specified distance among vehicles located in neighboring lanes as a target object.

In operation 715, the apparatus may generate a route. For example, the apparatus may generate a route for lane keeping, avoidance in a lane, a lane change, and the like.

In operation 720, the apparatus may determine whether a risk is detected. For example, when a surrounding vehicle is located in a longitudinal avoidance zone or a lateral avoidance zone, the apparatus may detect a risk.

In operation 725, the apparatus may classify the risk as a longitudinal risk or a lateral risk. For example, when the risk is detected in only one direction, the apparatus may determine the risk as the lateral risk. When the risk is detected in both directions, the apparatus may determine the risk as the longitudinal direction.

When needing lateral avoidance, in operation 730, the apparatus may determine whether the risk corresponds to a left direction risk.

When the risk corresponds to the left direction risk, in operation 735, the apparatus may perform avoidance driving to the right.

When the risk corresponds to a right direction risk, in operation 740, the apparatus may perform avoidance driving to the left.

When needing longitudinal avoidance, in operation 745, the apparatus may perform longitudinal avoidance driving, that is, deceleration driving.

When the risk is not detected, in operation 750, the apparatus may maintain a current driving state.

In operation 755, the apparatus may output a driving situation. The apparatus may output information about a system state to a driver of the vehicle in the form of an image, an animation, and/or a voice.

Figure 8:
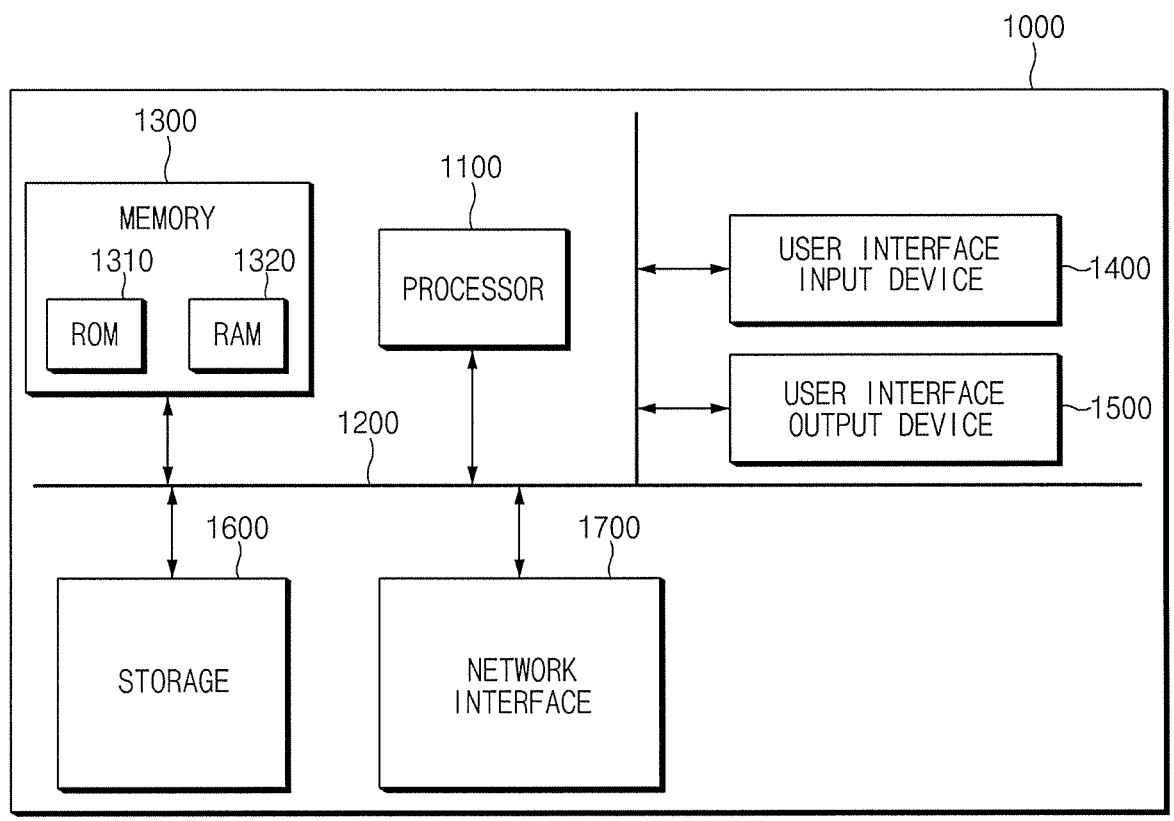
FIG. 8 is a block diagram illustrating a configuration of a computing system according to an embodiment of the present disclosure.

FIG. 8 is a block diagram illustrating a configuration of a computing system according to an embodiment of the present disclosure.

Referring to FIG. 8, the above-mentioned method according to an embodiment of the present disclosure may be implemented through the computing system. A computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for executing processing of instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

The apparatus for controlling driving of the vehicle according to an embodiment of the present disclosure may reduce anxiety the driver feels due to a surrounding vehicle located in a neighboring lane by providing a UI for displaying a strategy and avoidance driving for avoiding the surrounding vehicle which is traveling in a state where it is slanted in the direction of a driving lane from the neighboring lane.

In addition, various effects indirectly or directly ascertained through the present disclosure may be provided.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling driving of a vehicle, the apparatus comprising:
   a display located in the vehicle;
   a sensor configured to collect information about a surrounding vehicle; and
   a processor configured to be electrically connected with the display and the sensor,
   wherein the processor is configured to:
   obtain location information and speed information of at least one surrounding vehicle located on neighboring lanes beside a driving lane where the vehicle is traveling, using the sensor;
   when the at least one surrounding vehicle is located within an avoidance zone in a lateral direction of the vehicle, perform avoidance driving for avoiding the at least one surrounding vehicle in the driving lane; and
   display an indicator corresponding to the avoidance driving on the display,
   wherein the processor determines that the at least one surrounding vehicle is travelling close to the driving lane when the at least one surrounding vehicle is located within the avoidance zone.

2. The apparatus of claim 1, wherein the processor is further configured to:
   when a relative speed between the at least one surrounding vehicle and the vehicle is less than a specified value, perform the avoidance driving.

3. The apparatus of claim 1, wherein the processor is further configured to:
   when the at least one surrounding vehicle is located within a specified distance in a longitudinal direction of the vehicle, perform the avoidance driving.

4. The apparatus of claim 1, wherein the processor is further configured to:
   set the avoidance zone based on at least a portion of a size of the vehicle, a speed of the vehicle, a size of the at least one surrounding vehicle, a speed of the at least one surrounding vehicle, or a width of the driving lane.

5. The apparatus of claim 1, wherein the processor is further configured to:
   when one surrounding vehicle is located within the avoidance zone in the lateral direction of the vehicle, perform the avoidance driving along a route away from the one surrounding vehicle in the driving lane.

6. The apparatus of claim 5, wherein the processor is further configured to:
display the indicator indicating a direction of the avoidance driving on the display.

7. The apparatus of claim 5, wherein the processor is further configured to:
display an indicator indicating a direction of the avoidance driving within a zone indicating the driving lane on the display.

8. The apparatus of claim 5, wherein the processor is further configured to:
when the one surrounding vehicle is located within a specified distance from the vehicle in a forward direction, calculate the route.

9. The apparatus of claim 5, wherein the processor is further configured to:
when the one surrounding vehicle is located within a specified distance from the vehicle in a rear direction, maintain the avoidance driving.

10. The apparatus of claim 5, wherein the processor is further configured to:
when the one surrounding vehicle is located further than a specified distance from the vehicle in a rear direction, release the avoidance driving.

11. The apparatus of claim 1, wherein the neighboring lanes comprise a first neighboring lane located on a left-hand side of the driving lane and a second neighboring lane located on a right-hand side of the driving lane,
wherein the at least one surrounding vehicle comprises a first surrounding vehicle located on the first neighboring lane and a second surrounding vehicle located on the second neighboring lane, and
wherein the processor is further configured to:
when the first surrounding vehicle and the second surrounding vehicle are located in the avoidance zone in the lateral direction of the vehicle, perform the avoidance driving by reducing a speed of the vehicle.

12. The apparatus of claim 11, wherein the processor is further configured to:
display indicators respectively corresponding to a first object indicating the first surrounding vehicle and a second object indicating the second surrounding vehicle on the display.

13. The apparatus of claim 11, wherein the processor is further configured to:
display an indicator indicating the reduction of the speed of the vehicle on the display.

14. The apparatus of claim 11, wherein the processor is further configured to:
when the first surrounding vehicle and the second surrounding vehicle are located within the avoidance zone in the lateral direction of the vehicle and within a specified distance from the vehicle in a forward direction, calculate a target speed of the vehicle and control the vehicle to perform deceleration driving depending on the target speed.

15. A method for controlling driving of a vehicle, the method comprising:
obtaining, by a processor, location information and speed information of at least one surrounding vehicle located on neighboring lanes beside a driving lane where the vehicle is traveling;
when the at least one surrounding vehicle is located within an avoidance zone in a lateral direction of the vehicle, performing, by the processor, avoidance driving for avoiding the at least one surrounding vehicle in the driving lane; and
displaying, by the processor, an indicator corresponding to the avoidance driving,
wherein the processor determines that the at least one surrounding vehicle is travelling close to the driving lane when the at least one surrounding vehicle is located within the avoidance zone.

16. The method of claim 15, wherein the performing of the avoidance driving includes performing the avoidance driving when a relative speed between the at least one surrounding vehicle and the vehicle is less than a specified value.

17. The method of claim 15, wherein the performing of the avoidance driving includes performing the avoidance driving when the at least one surrounding vehicle is located within a specified distance in a longitudinal direction of the vehicle.

18. The method of claim 15, the method further comprising setting the avoidance zone based on at least a portion of a size of the vehicle, a speed of the vehicle, a size of the at least one surrounding vehicle, a speed of the at least one surrounding vehicle, or a width of the driving lane.

19. The method of claim 15, wherein the performing of the avoidance driving includes performing the avoidance driving along a route away from one surrounding vehicle in the driving lane when the one surrounding vehicle is located within the avoidance zone in the lateral direction of the vehicle.

20. The method of claim 19, the method further comprising when the one surrounding vehicle is located within a specified distance from the vehicle in a forward direction, calculating the route.

* * * * *